US010333865B2

(12) United States Patent
Borikar et al.

(10) Patent No.: US 10,333,865 B2
(45) Date of Patent: Jun. 25, 2019

(54) TRANSFORMATION OF PERIPHERAL COMPONENT INTERCONNECT EXPRESS COMPLIANT VIRTUAL DEVICES IN A NETWORK ENVIRONMENT

(71) Applicant: CISCO TECHNOLOGY, INC., San Jose, CA (US)

(72) Inventors: Sagar Borikar, San Jose, CA (US); Prabhath Sajeepa, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 710 days.

(21) Appl. No.: 14/831,894

(22) Filed: Aug. 21, 2015

(65) Prior Publication Data

US 2017/0054593 A1 Feb. 23, 2017

(51) Int. Cl.
*G06F 15/177* (2006.01)
*H04L 12/931* (2013.01)
*H04L 12/24* (2006.01)

(52) U.S. Cl.
CPC .......... *H04L 49/35* (2013.01); *H04L 41/0816* (2013.01); *H04L 41/12* (2013.01)

(58) Field of Classification Search
CPC ..... H04L 49/35; H04L 41/0816; H04L 41/12; G06F 11/07; G06F 13/4027
See application file for complete search history.

(56) References Cited

U.S. PATENT DOCUMENTS 6,810,452 B1 * 10/2004 James ................ H04L 12/2803
710/104

7,366,123 B1 * 4/2008 Biederman ............... G06F 1/30
370/311

(Continued)

OTHER PUBLICATIONS

Piotrowski, et al., "PCIExpress Hot-Plug Mechanism in Linux-based ATCA Control Systems," International Journal of Microelectronics and Computer Science, vol. 1, No. 2, 2010, 4 pages; originally published for 17th International Conference Mixed Design of Integrated Circuits and Systems Wroctaw, Jun. 24-26, 2010, Poland http://ieeexplore.ieee.org/xpl/articleDetails.jsp?reload=true&arnumber=5551537.

(Continued)

*Primary Examiner* — Frantz B Jean
(74) *Attorney, Agent, or Firm* — Polsinelli PC

(57) ABSTRACT

An example method for transformation of Peripheral Component Interconnect Express (PCIe) compliant virtual devices in a server in a network environment is provided and includes receiving, during runtime of the server, a request to change a first configuration of a PCIe compliant virtual device to a different second configuration, identifying a bridge on a PCIe topology below which the virtual device is located, issuing a simulated secondary bus reset to the bridge, the virtual device being reconfigured according to the change in configuration after the simulated secondary bus reset is issued, re-enumerating below the bridge after the change in configuration completes without rebooting the server, and updating the PCI topology with the virtual device in the second configuration. A virtual interface card adapter traps the simulated secondary bus reset, removes the virtual device from the PCI topology, and reconfigures the virtual device from the first configuration to the second configuration.

20 Claims, 5 Drawing Sheets

(56) References Cited

U.S. PATENT DOCUMENTS

| | | | | |
|---|---|---|---|---|
| 7,752,360 B2* | 7/2010 | Galles | G06F 13/10 | 710/10 |
| 8,041,871 B2* | 10/2011 | Deshpande | G06F 13/4226 | 710/3 |
| 8,225,005 B2* | 7/2012 | Freimuth | G06F 13/4022 | 710/5 |
| 8,463,881 B1* | 6/2013 | Baker | H04L 29/06 | 709/220 |
| 8,930,608 B2* | 1/2015 | Li | G06F 3/0617 | 710/305 |
| 8,977,733 B1* | 3/2015 | Phuong | H04L 12/12 | 709/220 |
| 9,436,244 B2* | 9/2016 | He | G06F 1/3253 | |
| 9,507,736 B2* | 11/2016 | Shah | H04L 41/04 | |
| 9,729,469 B2* | 8/2017 | Tripathi | H04L 49/25 | |
| 2005/0081115 A1* | 4/2005 | Cheng | G06F 11/0724 | 714/47.1 |
| 2005/0191997 A1* | 9/2005 | Spearman | H04L 51/12 | 455/418 |
| 2005/0251609 A1* | 11/2005 | Chou | G06F 13/4081 | 710/313 |
| 2007/0260672 A1* | 11/2007 | Almeida | G06F 11/2284 | 709/203 |
| 2007/0283059 A1* | 12/2007 | Ho | G06F 13/102 | 710/104 |
| 2008/0235415 A1* | 9/2008 | Clark | G06F 17/5031 | 710/105 |
| 2008/0288661 A1* | 11/2008 | Galles | G06F 13/10 | 710/3 |
| 2010/0146089 A1* | 6/2010 | Freimuth | G06F 13/4022 | 709/222 |
| 2010/0251001 A1* | 9/2010 | Drescher | G01R 31/3177 | 714/2 |
| 2010/0287290 A1* | 11/2010 | Bramley | G06F 21/566 | 709/229 |
| 2011/0078299 A1* | 3/2011 | Nagapudi | H04L 12/12 | 709/223 |
| 2012/0215947 A1* | 8/2012 | Brownlow | G06F 13/4221 | 710/10 |
| 2013/0024595 A1* | 1/2013 | Subramaniyan | G06F 13/28 | 710/308 |
| 2013/0159686 A1* | 6/2013 | Graham | G06F 9/5077 | 713/1 |
| 2014/0059195 A1* | 2/2014 | Sajeepa | H04L 49/9063 | 709/223 |
| 2014/0164666 A1* | 6/2014 | Yang | G06F 13/28 | 710/308 |
| 2016/0028654 A1* | 1/2016 | Tripathi | H04L 49/25 | 370/355 |
| 2016/0188518 A1* | 6/2016 | Gardiner | G06F 13/4045 | 710/104 |
| 2016/0283428 A1* | 9/2016 | Guddeti | G06F 13/4027 | |
| 2016/0359743 A1* | 12/2016 | Dong | G06F 13/00 | |
| 2017/0046295 A1* | 2/2017 | Schwemmer | G06F 13/4022 | |
| 2017/0123475 A1* | 5/2017 | Diefenbaugh | G06F 1/3206 | |

OTHER PUBLICATIONS

Budruk, "An Introduction to PCI Express," MindShare, 18 pages; First published on or about May 26, 2012 http://www.mindshare.com/files/resources/MindShare_Intro_to_PCIe.pdf.

"PCI Hot-Plug Specification," PCI Special Interest Group (SIG), Revision 1.1, Jun. 20, 2001, 40 pages.

* cited by examiner

TRANSFORMATION OF PERIPHERAL COMPONENT INTERCONNECT EXPRESS COMPLIANT VIRTUAL DEVICES IN A NETWORK ENVIRONMENT

TECHNICAL FIELD

This disclosure relates in general to the field of communications and, more particularly, to transformation of Peripheral Component Interconnect Express (PCIe) compliant virtual devices in a network environment.

BACKGROUND

Computing systems including many advanced networking devices (such as switches and routers) typically contain a combination of hardware and software components, such as processors, buses, memory elements, input/output devices, operating systems and applications. Computing systems also include a data transfer subsystem to transfer data between the components inside the computing system. Older data transfer subsystems, such as Peripheral Component Interconnect ('PCI') and the PCI-eXtended ('PCI-X'), include a computer bus that logically connects several components over the same set of wires and transfers data among the components in parallel. Newer data transfer subsystems, such as PCI Express ('PCIe') based subsystems, include point-to-point connections between components that facilitate serial data transmittal.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for transformation of PCIe compliant virtual devices in a server in a network environment is provided and includes receiving, during runtime of the server, a request to change a first configuration of a PCIe compliant virtual device to a different second configuration, identifying a bridge on a PCIe topology below which the virtual device is located, issuing a simulated secondary bus reset to the bridge, the virtual device being reconfigured according to the change in configuration after the simulated secondary bus reset is issued, re-enumerating below the bridge after the change in configuration completes without rebooting the server, and updating the PCI topology with the virtual device in the second configuration. A virtual interface card adapter traps the simulated secondary bus reset, removes the virtual device from the PCI topology, and reconfigures the virtual device from the first configuration to the second configuration.

As used herein, the term "configuration" refers to parameters that control, influence, or otherwise regulate functional behavior of a PCIe compliant virtual device when connected to the server. Configuration can include, by way of examples and not as limitations, device identification, device capabilities, memory resource requirements, device functions, power requirements, latency requirements, and type of device.

Example Embodiments

Figure 1:
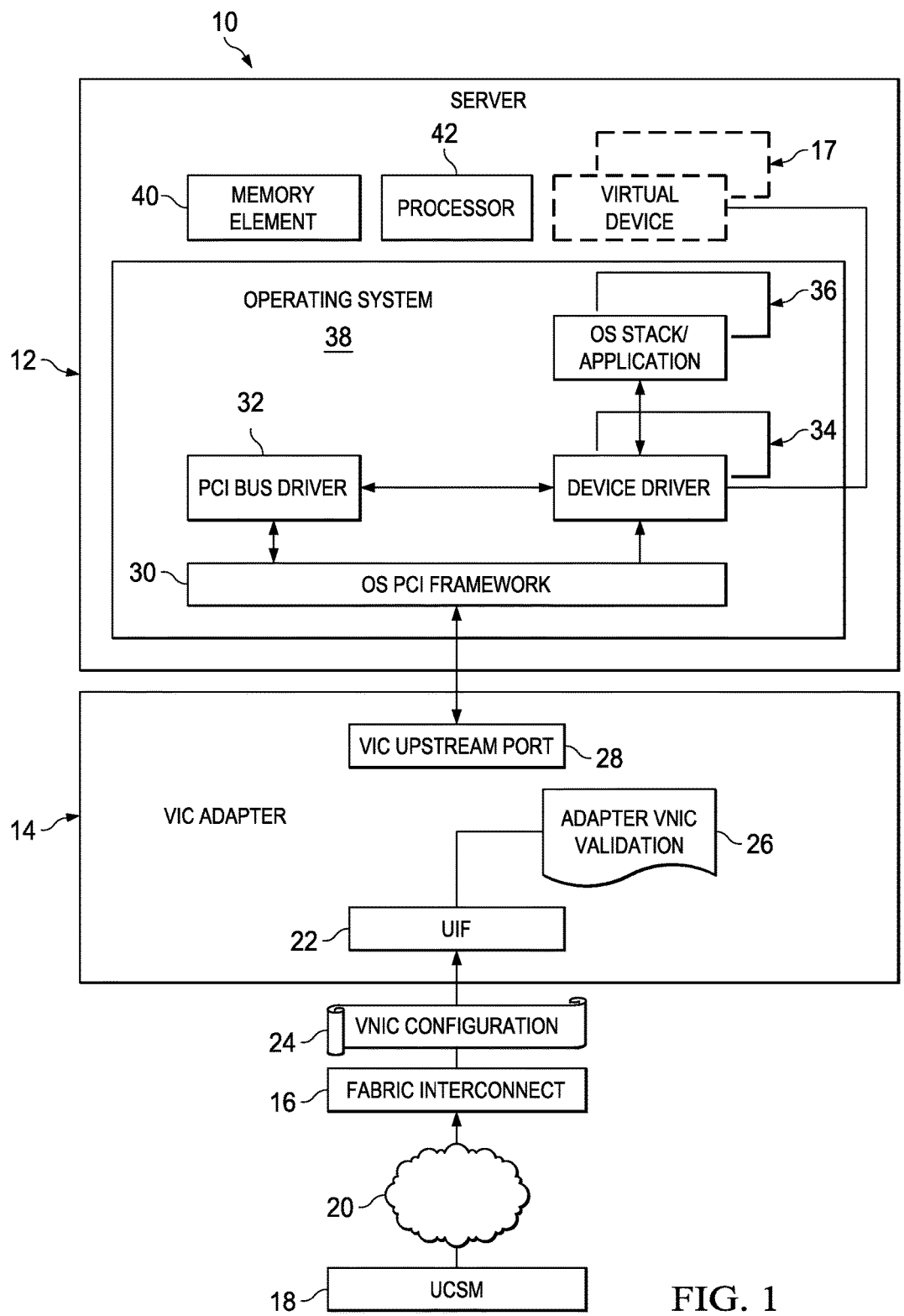
FIG. 1 is a simplified block diagram illustrating a communication system for facilitating transformation of PCIe compliant virtual devices in a network environment.

Turning to FIG. 1, FIG. 1 is a simplified block diagram illustrating a communication system 10 for facilitating transformation of PCIe compliant virtual devices in a network environment in accordance with one example embodiment. FIG. 1 illustrates a communication system 10 comprising a server 12 to which is coupled a virtual interface card (VIC) adapter 14. VIC adapter 14 enables connection of server 12 to a fabric interconnect 16, which is managed by a unified computing system manager (UCSM) 18 over a network 20. Note that server 12 can include, in a general sense, any suitable network element, which encompasses computers, network appliances, servers, routers, switches, gateways, bridges, load-balancers, firewalls, processors, modules, or any other suitable device, component, element, or object operable to exchange information in a network environment. Moreover, the network elements may include any suitably configured hardware provisioned with suitable software, components, modules, interfaces, or objects that facilitate the operations thereof. This may be inclusive of appropriate algorithms and communication protocols that allow for the effective exchange of data or information.

VIC adapter 14 provides high speed (e.g., 10G/40G) input/output (I/O) interfaces to server 12 through one or more uplink interface 22. The I/O interfaces, called virtual Network Interface Cards (VNICs) (not shown) may be used for network or storage traffic and/or access. The VNICs comprise PCIe endpoints created in VIC adapter firmware on VIC adapter 14 and present fully compliant standard PCIe topology to server 12. In a general sense, a particular virtual machine executing in server 12 may have multiple VNICs, each connected to different networks. The VNICs appear as separate virtual (e.g., logical) devices 17 to the VMs (e.g., applications) in server 12. Each virtual device 17 appears to server 12 (e.g., to operating system of server 12, or to virtual machine executing thereon) as a local PCIe device on server 12's PCIe bus for use by server 12's local processor, and I/O traffic is passed up the host PCIe bus and mapped to appropriate shared resources (e.g remote/local storage or networking interfaces).

VIC adapter 14 receives VNIC configuration 24 from UCSM 18 through fabric interconnect 16. VNIC configuration 24 may include various attributes such as Ethernet controller, fibre channel controller, Single root i/o Virtualization (Sr-ioV), Virtual Machine Queues (VMQ), Remote Direct Memory Access (RDMA) over Converged Ethernet (RoCE). UCSM 18 sends VNIC configuration 24 to VIC adapter 14 through predefined protocol. An adapter VNIC validation module 26 executing in VIC adapter 14 validates VNIC configuration 24; after validation, VIC adapter 14 accepts VNIC configuration 24 and prepares itself to accommodate the same. VIC adapter 14 communicates with server 12 over VIC upstream port 28.

On the first startup of the VNIC, it is assigned a PCI address, triggering server 12's OS PCI framework 30. OS PCI framework 30 comprises software and hardware components that make the PCIe compliant virtual device (e.g., VNIC) 17 look like a computer peripheral (such as a keyboard or mouse) to the VM. OS PCI framework 30 may comprise design files and application programming interfaces (APIs) to access memory mapped registers and enable instantiation and control of various logic blocks.

OS PCI framework 30 interacts with a PCI bus driver 32 and a device driver 34. Device driver 34 interacts with the virtual machine's operating system or application stack 36, for example, facilitating direct access of application data structures in hardware. In a general sense, device driver 34 comprises software that acts as an interface between server 12's operating system (OS) 38 and hardware, for example, processor 42 and memory element 40. Each virtual device 17 corresponds to a separate device driver 34. Device driver 34 interfaces with the operating system BIOS to allocate memories, examine the PCIe slot(s) information for configuration, etc. for the corresponding virtual device. Device driver 34 translates general OS commands into specialized commands for a particular virtual device 17, which allows OS 38 to communicate with virtual device 17. In a general sense, device driver software is different from firmware, which comprises lower-level code installed (e.g., stored in non-volatile memory, such as ROM, Erasable Programmable ROM (EPROM), or flash memory) on hardware devices, such as VIC adapter 14.

Device driver 34 also interacts with PCI bus driver 32. PCI bus driver 32 works with various device driver(s) 34 and the OS PCI framework 30, keeping track of the virtual devices populated by VIC adapter 14 and the PCI topology presented to server 12's operating system 38. In a general sense, PCI bus driver 32 manages requests for configuration space information for virtual devices 17 according to PCI specifications, which provide for software driven initialization and configuration of each PCIe device via a Configuration Address Space in memory. Configuration read/write cycles are used to access the Configuration Address Space of each PCIe device to change configuration settings. In various embodiments, PCI bus driver 32 is responsible for enumerating, configuring, and controlling virtual devices 17; on the other hand, device driver 34 is responsible for saving and restoring device context and requesting power state changes as the policy owner of corresponding virtual device 17. Note that PCI bus driver 32 facilitates instantiation and management of substantially all virtual devices in server 12, whereas device driver 34 instantiates and manages a single virtual device in server 12. To illustrate further, when a particular virtual device, say VNIC-1 is turned off, corresponding device driver 34 saves its proprietary device state; PCI bus driver 32 saves plug and play information, disables VNIC-1 (e.g., interrupts and BARs) and puts VNIC-1 in power off state. In another example, PCI bus driver 32 scans the PCI configuration space looking for any device that is turned on to assert a system wake-up, and informs device driver 34 that it is asserting wake-up.

In various embodiments, OS PCI framework 30, PCI bus driver 32, device driver 34, and OS/application stack 36 operate in operating system 38's environment. PCI bus driver 32 and device driver 34 comprise software drivers in various embodiments. Server 12 further comprises various hardware components, such as memory element 40 and processor 42. Note that various processing capabilities of separate hardware components may be logically represented in the FIGURE by processor 42. Likewise, separate storage devices, including various types of memory regions may be logically represented by memory element 40.

VIC adapter 14 creates a PCI bus topology to map virtual device 17 to server 12 as per PCI standards. In typical systems, when server 12 is booted (e.g., powered up), BIOS software enumerates virtual devices (e.g., virtual device 17) and presents them to OS 38; upon receiving the virtual device list from the BIOS, server OS 38 maps the virtual devices using appropriate device drivers 34 compatible therewith. Various embodiments of communication system 10 can further facilitate dynamic configuration of the virtual devices (e.g., virtual device 17) without rebooting server 12, facilitating flexible deployment of the virtual devices in server 12. As used herein, the term "dynamic configuration" relates to configuration change (e.g., change in attributes, features, requirements, functionalities, etc.) during operation (e.g., normal functioning, runtime, etc.) of server 12, without powering off, rebooting, or otherwise disrupting normal operations of server 12. An administrator can accommodate any changes in configuration without disturbing functional and deployed server 12. In addition, server 12 does not have to be powered off to reconfigure the virtual devices. Embodiments of communication system 10 can be advantageous in service provider networks, where server downtime can affect serviceability of applications.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Turning to the general functionality of PCIe protocols, topology, structures and operations, the VIC adapter creates a bridge topology below which the virtual devices are placed as endpoints, thereby enabling the virtual devices to appear on a PCI bus. In a general sense, a PCI bridge connects PCI buses suitably. Each bridge may be associated with an upstream port and a downstream port (an interface between a PCIe component and a connecting link on the PCI bus including transmitters and receivers). According to PCIe terminology, the upstream port points in the direction of the root complex, which connects the processor and memory subsystem of the server to the PCIe fabric (e.g., bus); the downstream port points away from the root complex. For example, a PCI device port is an upstream port; a root complex port(s) is a downstream port. In another example, one port of a PCI bridge pointing in the direction of the root complex is an upstream port; all other ports of the bridge pointing away from the root complex are downstream ports.

After the PCI topology is finalized, hardware resources such as queues and interrupts are created in the VIC adapter, and presented to the server. In typical PCIe compliant systems, the hardware resources cannot be changed until the server is power cycled or rebooted. Thus, the PCIe topology is rigid, requiring rebooting of the server to accommodate changes in any virtual device's configuration.

Consider, for example, that the server is configured with two Ethernet controller PCIe devices and two Fibre channel controller PCIe devices with a standard feature set deployed for highly available deployment. Any change, such as making one of the Ethernet devices SRIOV capable, cannot be accomplished until the server is rebooted. Server rebooting is an expensive and time consuming operation, for example, if the server is deployed in financial institutions that specify zero downtime. Also, if the server hosts several virtual machines, the virtual machines may have to be migrated before the server can be rebooted. In such cases, changes to virtual device configuration may have to wait until a next maintenance cycle, making the server inflexible to adopt custom attribute or configuration changes. This can limit the server's capabilities, for example, making the server inappropriate for environments in which the server is to be repurposed to run different applications based on demand.

In particular, the VIC enabled virtual devices in currently existing PCIe compliant systems are not runtime configurable. Changes in attributes or configuration of the already provisioned virtual devices cannot be performed in a normally operating mode of the server. Nevertheless, PCI Hot Plug mechanism may be used for runtime configuration changes, if needed. In a general sense, the Hot Plug mechanism provides three capabilities: (i) a method of replacing failed expansion cards without turning the system off; (ii) keeping the OS and other services running during the repair; and (iii) shutting down and restarting software associated with the failed device.

In a general sense, Hot Plug removal includes the following steps. A user determines that a PCIe device (e.g., in the form of an adapter card) must be removed or replaced, and notifies the Hot-Plug Service (i.e., high-level software having overall control of the Hot Plug operations; it includes a user interface and can issue requests to the operating system to quiesce device drivers; it is typically unique to the operating system) executing in the server of the desire to remove the card from its slot. Notification methods might include issuing a console command or activating a switch designed for this purpose. The Hot-Plug Service uses operating system functions to quiesce the appropriate device driver instance(s). The Hot-Plug Service issues a Hot-Plug Primitive (i.e., specific requests issued by the Hot Plug Service to a Hot Plug System Driver to determine status of slots on the PCI bus) to a Hot-Plug System Driver (i.e., software driver controlling ad monitoring Hot Plug Controller hardware) to turn off the appropriate slot. The Hot-Plug System Driver uses a Hot-Plug Controller (i.e., hardware that controls powering up and down a PCI slot) to isolate the slot from the rest of the bus, power down the slot and change a slot state indicator to show that the slot is turned off. The Hot-Plug Service reports to the user that the slot is off. The user removes the PCIe device.

In a general sense, Hot Plug insertion includes the following steps. The user inserts the new PCIe device into an appropriate slot on the PCI bus. The user notifies the Hot-Plug Service to turn on the slot containing the new device. The Hot-Plug Service issues a Hot-Plug Primitive to the Hot-Plug System Driver to turn on the appropriate slot. The Hot-Plug System Driver uses the Hot-Plug Controller to power up the slot, connect the slot to the rest of the bus and change the slot-state indicator to show that the slot is on. The Hot-Plug Service notifies the operating system that the new device is installed, so that the operating system can initialize the device and prepare to use it. The Hot-Plug Service notifies the user that the device is ready.

PCIe devices are plugged and powered after booting the OS in the Hot Plug mechanism. When using the Hot Plug mechanism, the Hot Plug controller hardware detects whether a new PCI device is plugged in and is ready to use. The Hot Plug controller informs the Hot Plug Service handling the discovery and resource management of the newly-powered PCI devices. The Hot Plug Service controls device interface signals to ensure orderly power down and power up as devices are removed and replaced on the PCI bus.

In the Hot-Plug mechanism, the user is not permitted to install or remove any PCIe compatible device without first notifying the Hot Plug Service. The Hot Plug Service prepares both the device and the device interface for the device's removal and replacement, and finally indicates to the user (via visual indicators) status of the Hot Plug process and notification that installation or removal may be performed. The Hot Plug operations are typically OS dependent. In a general sense, an interrupt is generated when a slot status changes during the Hot Plug operations, from connected to disconnected and vice versa. The operating system (OS) captures the interrupt and allocates or reallocates resources to the inserted or removed device.

In a general sense, the Hot Plug mechanism requires several changes in the server and firmware ecosystem, making the Hot Plug mechanism unsuitable in some cases. Further, the number of vNICs that can be configured during runtime through Hot Plug mechanism are limited, as the Hot Plug capable downstream ports are limited in number according to the PCI specification. PCI Hot Plug is an exhaustive process that requires several tedious mechanisms, including server interventions, as per the PCI specifications. Moreover, the Hot Plug mechanism does not allow device attributes under any downstream ports to be changed during runtime—only insertion and removal of devices are permitted using the Hot Plug mechanism.

Another PCIe operation that may be used to reset (e.g., restore PCI configuration registers of) PCIe devices is the PCIe hot reset. The PCIe hot reset is triggered by setting a secondary bus reset bit of a bridge control register in the downstream port of a PCIe switch. The secondary bus reset on a downstream port resets all devices connected to the downstream port to their respective initial default states; the secondary bus reset on an upstream port resets all downstream ports of the bridge, and all devices connected to such downstream ports. In a general sense, the hot reset issued to the upstream port of the bridge resets (e.g., initializes) all the devices below its downstream ports (e.g., if bridge has 3 downstream ports, the reset is passed to all three downstream ports which in turn is passed to all the devices connected to downstream ports.)

The end devices reset themselves and clear any configuration (e.g., resource addresses, interrupt configuration, bus, function identity, etc.) performed by the host software. The host software loses its PCI topology below the upstream port (e.g., if three device configurations are stored below the upstream ports of the bridge, all three device configurations are deleted). Further, after the devices are initialized, the host software re-runs PCI enumeration from the upstream port to the bridge, re-allocates resources, bus device functions and loads the device driver. The hot reset may therefore be used to reset PCIe devices to their initial state, for example, when the devices are corrupted, or do not function appropriately, and to stop direct memory access (DMA) by the devices. The hot reset mechanism cannot be currently used to change any attributes of the reset device.

Communication system 10 is configured to address these issues (among others) to offer a system and method for transformation of PCIe compliant virtual devices (e.g., virtual device 17) in a network environment. Embodiments of communication system 10 provide a way to allow transformation of virtual device 17, using a simulated secondary bus reset feature to make run time configuration changes with the help of driver software (e.g., PCI bus driver 32, device driver 34) in OS 38 and VIC adapter 14. Embodiments of communication system 10 provide following capabilities (among others): dynamically changing attributes of already provisioned virtual device 17 without requiring server power cycle or reboot; no necessity to follow the complicated PCI Hot Plug mechanism to change the configuration of virtual device 17; allowing Ethernet controller devices to be projected as Fibre Channel controller devices; and adding and removing existing configurations of specific virtual device 17 according to various network demands without disturbing existing deployment of other virtual devices in the system.

During operation, UCSM 18 pushes new VNIC configuration 24 of specific PCIe compliant virtual device 17 (e.g., VNIC-1) to VIC adapter 14 through UIF 22 connected to Fabric Interconnect 16. New VNIC configuration 24 may specify a change in configuration for virtual device 17 from a first configuration (e.g., Ethernet controller) to a second configuration (e.g., Fibre channel controller). Note that the configuration change can comprise any suitable change based on particular needs. For example, an administrator may decide that additional Fibre Channel controllers are needed in the network, and not as many Ethernet controllers, and the change in configuration may reflect such decisions.

Adapter VNIC validation 26 in VIC adapter 14 identifies virtual device 17 to be changed, validates VNIC configuration 24, and validates resource requirements for VNIC configuration 24, for example, ensuring that existing resources (e.g., memory spaces) populated by VIC adapter 14 can also accommodate the changed configuration (e.g., ensuring that resources allocated to virtual device 17 in the first configuration are sufficient to support the second configuration also). Typically, when any device is inserted, the BIOS in server 12 enumerates the device in the order it appears on the PCIe bus; OS 38 scans the PCIe devices when it boots and reserves memory and I/O resources specified in endpoint Base Address Registers (BARs).

In various embodiments, typical BAR sizes being powers of 2, the host-allocated memory size may be more than the resource requirements specified by VIC adapter 14; thus change in resource requirements can be accommodated to the extent that they are within the host allocated memory size. In some embodiments, VIC adapter 14 may specify a uniform (e.g., standard) resource size for similar types of virtual devices when populating the BARs in the host address space. The uniform resource size can be calculated to accommodate substantially all supported features by VIC adapter 14 for that particular type of virtual device.

In various embodiments, VIC adapter 14 may store information about the resources allocated to virtual devices 17 at server 12. Thus, when new VNIC configuration 24 comprising the second configuration is received from UCSM 18, VIC adapter may compare the resources indicated by the second configuration with the stored resource information and allow the change in configuration if the resources indicated by the second configuration are less than or equal to the stored resource information. If, according to VIC adapter 14, sufficient resources are available for the second configuration specified in VNIC configuration 24, VIC adapter 14 requests PCI bus driver 32 to initiate the change in configuration.

In various embodiments, PCI bus driver 32 receives, during runtime of server 12, the request from VIC adapter 14 and associated with virtual device 17 (e.g., VNIC-1), notifying of the change in configuration of virtual device 17 from the first configuration to the different second configuration as specified in VNIC configuration 24. PCI bus driver 32 identifies a bridge on a PCIe topology below which virtual device 17 is located. PCI bus driver 32 issues a simulated secondary bus reset to the upstream port of the bridge. For example, a secondary bus reset bit (e.g., bit 6) in a bridge control register (offset 0x3Eh) in Type 1 configuration header of the configuration space of the bridge may be set to indicate reset. The process then follows through with a recovery state of a Link Training and Status State Machine (LTSSM) according to normal PCIe operations. Note that the simulated secondary bus reset is similar to a hard secondary bus reset according to PCI standards, but it is not executed to fruition, and (among other differences) it is agnostic to OS 38 and applications in server 12.

In various embodiments, PCI bus driver 32 notifies device driver 34 associated with virtual device 17 about the configuration change before issuing the simulated secondary bus reset. The request issued by PCI bus driver 32 to appropriate device driver 34 may trigger device driver 34 to quiesce (e.g., render temporarily inactive, stall, etc.) the I/Os in OS stack/application 36 associated with targeted virtual device 17. In a general sense, when target virtual device 17 is quiesced, OS stack/application 36 will not send any PCI operations to targeted virtual device 17 and virtual device 17 will not initiate any interrupts or bus activity. Quiescing operations are typically operating system specific. Device driver 34 quiesces input/output (I/O) to and from virtual device 17 upon being informed of the upcoming configuration change and sends a notification to PCI bus driver 32 that virtual device 17 is quiesced. PCI bus driver 32 may issue the simulated secondary bus reset after receiving the notification from device driver 34.

In some embodiments, PCI bus driver 32 may start a driver unload sequence upon receiving the change configuration request from VIC adapter 14. The driver unload sequence may cause device driver 34 to quiesce virtual device 17, for example, including any ongoing I/O and releases hardware mapped resources associated with targeted virtual device 17, blocking access to virtual device 17 during the change in configuration (e.g., transformation). Device driver 34 informs OS stack/application 36 that it is undergoing an unload/load operation. After I/Os are successfully stalled on virtual device 17, device driver 34 informs PCI bus driver 32 that it is ready for the configuration change. PCI bus driver 32 may issue the simulated secondary bus reset after receiving the notification from device driver 34.

VIC adapter 14 reconfigures virtual device 17 according to VNIC configuration 24 after the simulated secondary bus reset is issued. For example, VIC adapter 14 traps (e.g., intercepts, for example, through an interrupt intended to change control of an executing set of instructions from one software or hardware component to another) the simulated secondary bus reset, populates the configuration change in virtual device 17 and issues a completion notification to PCI bus driver 32. In some embodiments, VIC adapter 14 removes virtual device 17 from a location having a location attribute (e.g., 02:01.0 BDF) in the PCI topology, reconfigures virtual device 17 from the first configuration to the second configuration, and associates virtual device 17 in the second configuration with the same (e.g., previous) location attribute (e.g., 02:01.0 BDF). In some embodiments, an altogether new virtual device can be instantiated below the bridge too.

In some embodiments, PCI bus driver 32 starts a timer for a preconfigured recovery time period (e.g., according to PCIe specifications, for example, associated with the recovery state of LTSSM, or initialization of virtual device 17, etc.) after issuing the simulated secondary bus reset. When the timer expires, or PCI bus driver 32 receives notification from VIC adapter 14 that configuration change is complete, PCI bus driver 32 re-enumerates PCIe devices below the bridge after the change in configuration completes without rebooting the server. In a general sense, as used herein, the term "re-enumerating" (and its variants) comprises a sequence of operations including discovering switch and endpoint devices in a PCIe topology, determining memory requirements for the various PCIe topology components and configuring the PCIe devices with appropriate memory mappings from a previous enumeration. For example, re-enumerating includes searching for memory registers during a startup, reading base address registers (BARs) to determine sizes of memory mapped input-output (MMIO) ranges for the associated devices, allocating memory regions for the specified MMIO ranges, and writing back to the BARs the addresses assigned for each device's MMIO range in the allocated MMIO space.

In an example embodiment, PCI bus driver 32 starts an enumeration sequence on the bridge, re-scanning the devices below the bridge, associating resources (e.g., memory regions) and identities to virtual devices, including virtual device 17, allocated prior to the configuration change (e.g., during initial enumeration). PCI bus driver 32 may also update the PCI topology with virtual device 17 in the second configuration. In some embodiments, after the preconfigured wait time, PCI bus driver 32 re-enumerates devices below the downstream port coupled to affected virtual device 17.

PCI bus driver 32 thereafter loads device driver 34. Device driver 34 initializes virtual device 14 and registers the changed configuration to OS stack/application 36. OS 38 can thereafter use the changed configuration on virtual device 17. Embodiments of communication system 10 allow changes to device attributes of virtual device 17 without rebooting server 12 despite not following PCI Hot Plug specifications.

Turning to the infrastructure of communication system 10, network topology of network 20 can include any number of servers, hardware accelerators, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

The example network environment in which adapter 12 operates may be configured over a physical infrastructure that may include one or more networks and, further, may be configured in any form including, but not limited to, local area networks (LANs), wireless local area networks (WLANs), VLANs, metropolitan area networks (MANs), VPNs, Intranet, Extranet, any other appropriate architecture or system, or any combination thereof that facilitates communications in a network.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, VIC adapter 14 comprises a physical dual-port Ethernet and Fibre Channel over Ethernet (FCoE)-capable PCIe card compatible with server 12. Server 12 comprises a hardware server, such as a blade server or rack server. In various embodiments, VIC adapter 14 comprises a motherboard configured with appropriate physical ports for input and output, firmware, for example, executing in specific integrated circuits, such as an application specific integrated circuit (ASIC), field programmable gate array (FPGA) or network processor. VIC adapter 14 enables a policy-based, stateless, agile server infrastructure that can present multiple PCIe standards-compliant interfaces to server 12. The PCIe standards-compliant interfaces can be dynamically configured as either network interface cards (NICs) or host bus adapters (HBAs). In some embodiments, VIC adapter 14 may be implemented in a stand-alone pluggable motherboard configured with appropriate interfaces. In other embodiments, VIC adapter 14 may be integrated into server 12.

Figure 2:
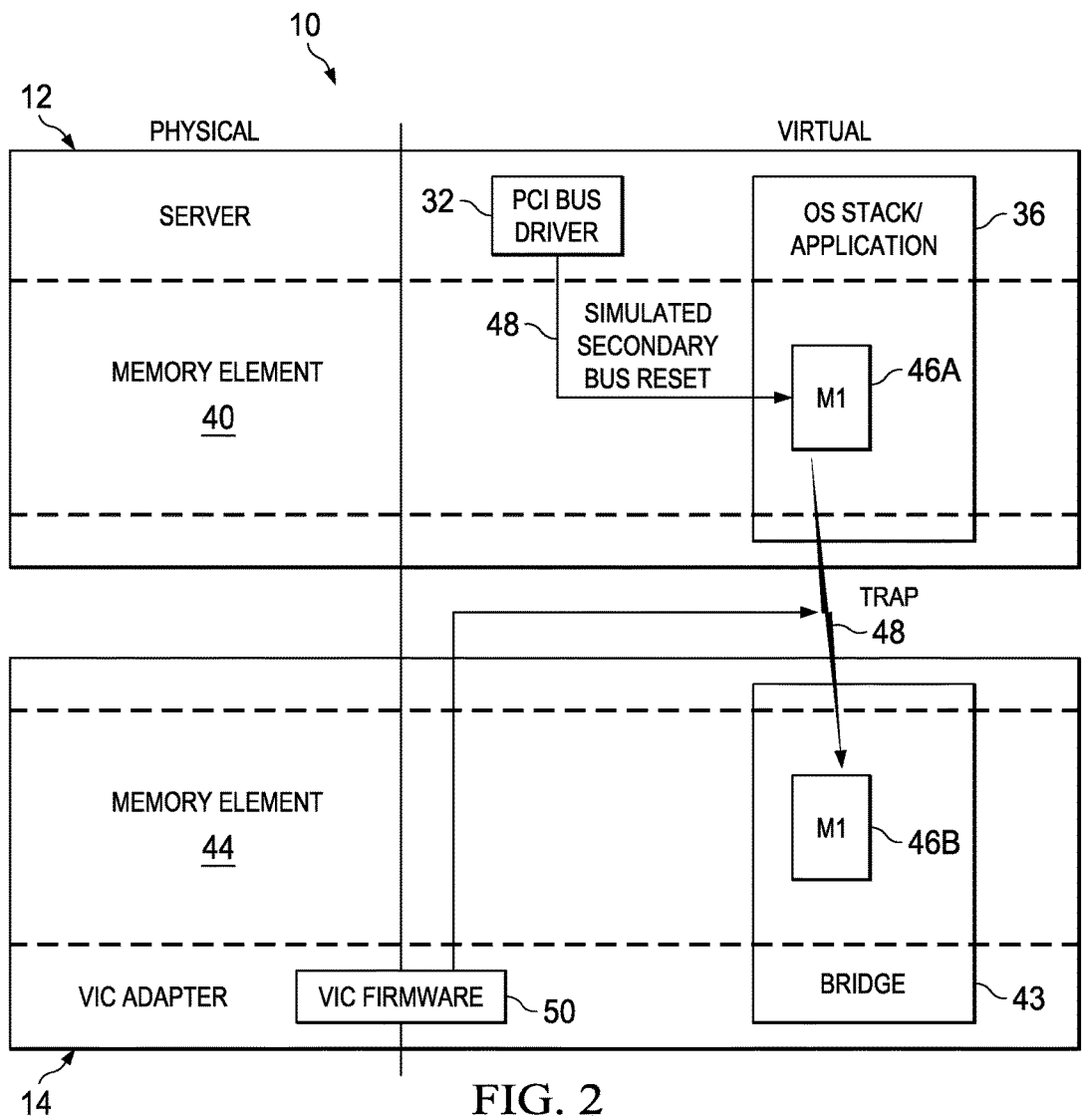
FIG. 2 is a simplified block diagram illustrating other example details of embodiments of the communication system.

Turning to FIG. 2, FIG. 2 is a simplified block diagram illustrating example details according to an embodiment of communication system 10. Communication system 10 may comprise a physical space and a virtual space, implemented and executing on the physical space. For example, server 12 may include one or more applications, represented by OS stack/application 36, which execute in the virtual space. Components of the PCIe topology, including virtual device 17 and various bridges, such as bridge 43, may be instantiated on VIC adapter 14 and assigned memory resources in memory element 44 of VIC adapter 14.

In the virtual PCIe architecture presented by embodiments of communication system 10, VIC adapter 14 provides a scalable virtual PCIe topology comprising a plurality of virtual devices 17. A variety of virtual PCIe functions and resources may be created within the virtual PCIe topology or within a single virtual device. A flexible mapping scheme allows mapping resources available at VIC adapter 14 to memory-mapped control regions associated with virtual devices 17. Virtual devices 17 created by VIC adapter 14 may be mapped to a particular host address range on VIC adapter 14 and may be configured to appear to server 12 as a physical PCIe device.

Every virtual device 17 and other components on the virtual PCIe topology has at least one associated entry in a configuration space of memory element 40, which allows the host software (e.g., OS stack/application 36) to perform various functions, such as detecting PCIe devices after reset or hot plug events, identifying the vendor and function of each PCIe device, discovering system resources (e.g. memory address space, interrupts, etc.) required by each PCIe device, assigning system resources to each PCIe device, enabling or disabling PCIe devices to respond to memory or I/O accesses, instructing the PCIe device on error conditions, programming routing of PCIe device interrupts, and various other functions. The virtual components of the PCIe topology, including bridge 43 may be accessed by OS stack/application 36 through a configuration space 46A in memory element 40 of server 12.

Configuration space 46A is virtual, in that it is mapped to corresponding configuration space 46B of memory element 44 of VIC adapter 14. Changes to configuration space 46A in server 12 may be reflected in configuration space 46B in VIC adapter 14, and vice versa. In some embodiments, PCI bus driver 32 may execute in the virtual space of server 12. Each virtual function of the PCIe topology has real device resources published to OS 38 through virtual configuration space 46A. In a general sense, configuration space 46A or 468 comprise configuration space registers mapped to memory locations. Device driver 34 (and other diagnostic software) have access to the configuration space, and operating systems typically use APIs to allow access to the configuration space.

Assume, merely as an example, and not as a limitation, that virtual device 17, whose configuration is to be changed resides under bridge 43. In various embodiments, during transformation of virtual device 17, PCI bus driver 32 may issue a simulated secondary bus reset 48 to configuration space 46A associated with bridge 43. Simulated secondary bus reset 48 may be trapped (e.g., intercepted) by VIC firmware 50 (straddling the physical space and virtual space of VIC adapter 14) when simulated secondary bus reset 48 is reflected in configuration space 46B. Thus, the simulated secondary bus reset is not actually effectuated in configuration space 46B. VIC firmware 50 thereafter proceeds with changing the configuration of virtual device 17 residing below bridge 43.

In various embodiments, unlike the traditional secondary bus reset mechanism, no hard reset is issued to VIC adapter 14 through simulated secondary bus reset 48. Also, as configuration space 46B is virtual, VIC firmware 50 can trap every change, including simulated secondary bus reset 48, to configuration space 46B of bridge 43. In various embodiments, writing to the secondary bus reset bit in configuration space 46A, which when trapped by VIC firmware 50, may initiate only device specific operation, unlike the traditional hard secondary bus reset mechanism, in which the reset is passed on to all downstream ports and devices.

Simulated secondary reset bit 48 does not cause VIC adapter 14 to reset, or change configuration of any virtual devices other than affected virtual device 17. In other words, the PCI bus, device function identity, resource addresses are not lost by OS 38. Rather, simulated secondary bus reset 48 is transparent to OS 38, which is not involved in the transformation process. As a result, the PCI topology is not entirely reset. After reconfiguring affected virtual device 17, VIC firmware 50 may inform PCI bus driver 32 of the configuration completion. PCI bus driver 32 may thereafter perform enumeration of devices below bridge 43, and associate the same hardware resources to the newly configured virtual device 17.

Figure 3:
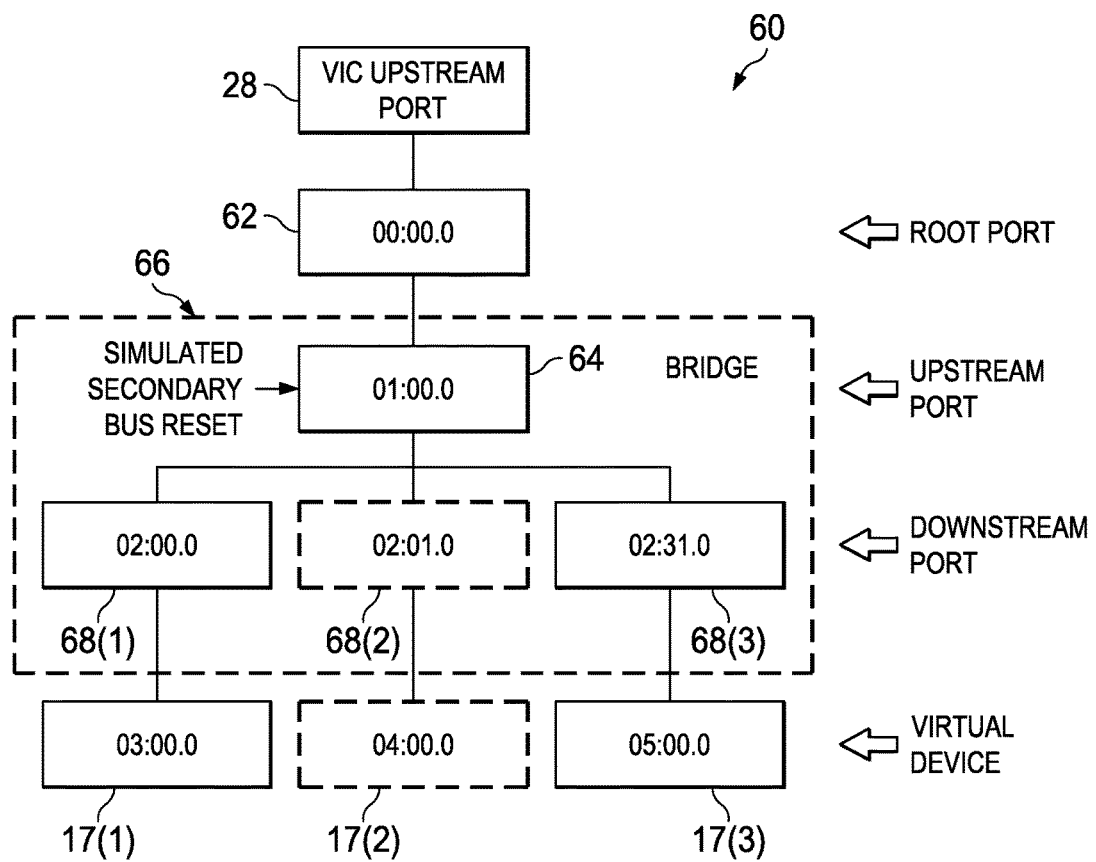
FIG. 3 is a simplified block diagram illustrating yet other example details of embodiments of the communication system.

Turning to FIG. 3, FIG. 3 is a simplified block diagram illustrating example details of a PCIe topology 60 according to an embodiment of communication system 10. In a general sense, the PCIe topology includes a root port defining a separate hierarchy domain, which may be composed of a single endpoint or a sub-hierarchy containing one or more switch components and endpoints. Switches provide an aggregation capability and allow more devices to be attached to a single root port. They act as packet routers determining packet paths based on the packet's destination address or other routing information. Bridges provide an interface to other buses, such as PCI or PCI X, or another PCIe bus. The PCI standard permits multiple independent PCI buses to be connected by bridges that forward operations on one bus to another when required. Although conventional PCI tends not to use many bridges, PCIe systems use many; each PCIe slot appears to be a separate bus, connected by a bridge to the others. In many cases, the bridge masquerades as an end point to discovery software, and translates addresses between primary and secondary bus segments. Typically, the switch may have several downstream ports but can only have one upstream port. Switches and bridges may be referred to herein interchangeably, without departing from the scope of the various embodiments.

In example embodiments, PCIe topology 60 includes VIC upstream port 28, which is connected to a PCIe root port 62, which is connected to an upstream port 64 (e.g., facing the root complex) of a bridge 66 having a plurality of downstream ports 68(1)-68(3). Note that PCIe topology is virtual, implemented on VIC adapter 14 in some embodiments. PCIe root port 62 may be assigned a bus device function (BDF) of 00:00.0. Upstream port 64 may be assigned a BDF of 01:00.0. Downstream ports 68(1)-68(3) may be assigned BDFs 02:00.0; 02:01.0; and 02:31.0, respectively. Virtual devices 17(1)-17(3), referred respectively by 03:00.0 BDF; 04:00.0 BDF; and 05:00.0 BDF are located below corresponding downstream ports 68(1)-68(3).

Assume, merely for example purposes and not as limitations, that virtual device 17(2), having a location attribute of 04:00.0 BDF, is a target for configuration changes. In many embodiments, bridge 66 may be identified by PCI bus driver 32 as associated with virtual device 17(2) undergoing configuration change. In many embodiments, VIC adapter 14 may capture and store resources mapped to virtual device 17(2) and the previous configuration changes implemented at the last PCI enumeration. VIC adapter 14 may send a notification to PCI bus driver 32 to initiate the change in configuration. PCI bus driver 32 issues a request to appropriate device driver 34 corresponding to virtual device 17(2) to quiesce I/Os at virtual device 17(2) and de-register virtual device 17(2) from OS and application stack 36. PCI bus driver 32 unloads and delinks device driver 34 from OS and application stack 36 and returns virtual device 17(2) to an initial state (e.g., before enumeration, or attachment to PCI bus).

PCI bus driver 32 issues a simulated secondary bus reset to upstream port 64 by setting bit 6 in Bridge Control register in Type 1 header of the configuration space of bridge 66 below which virtual device 17(2) resides. According to various embodiments, the simulated secondary bus reset does not trigger a reset of downstream ports 68(1)-68(3). PCI bus driver 32 may start a timer (e.g., LTSSM recovery timer) according to PCI specifications to facilitate virtual device 17(2) being initialized and reconfigured. VIC adapter 14 may trap the simulated secondary bus reset to upstream port 64. VIC adapter 14 may determine that virtual device 17(2) is ready for the configuration change and make the configuration change according to VNIC configuration 24 from UCSM 18.

After the configuration change is implemented, VIC adapter 14 may send a message to PCI bus driver 32 indicating that the configuration change event is completed. PCI bus driver 32 rescans the PCI bus below bridge 66 and reassigns (e.g., associates) the resources and the identity provided by OS 38 in the previous enumeration. PCI bus driver 32 preserves any system specific configuration so that OS PCI framework 30 does not see the difference in the configuration upon notification. Post successful enumeration, PCI bus driver 32 may link appropriate device driver 34 with virtual device 17(2) (e.g., load device driver 34). Device driver 34 starts afresh to initialize virtual device 17(2), scans the properties of virtual device 17(2) and present the scanned properties to OS 38. For example, if new capabilities (e.g., SRIOV, VMQ, RoCE) are added, they are reported to OS stack/application 36.

Figure 4:
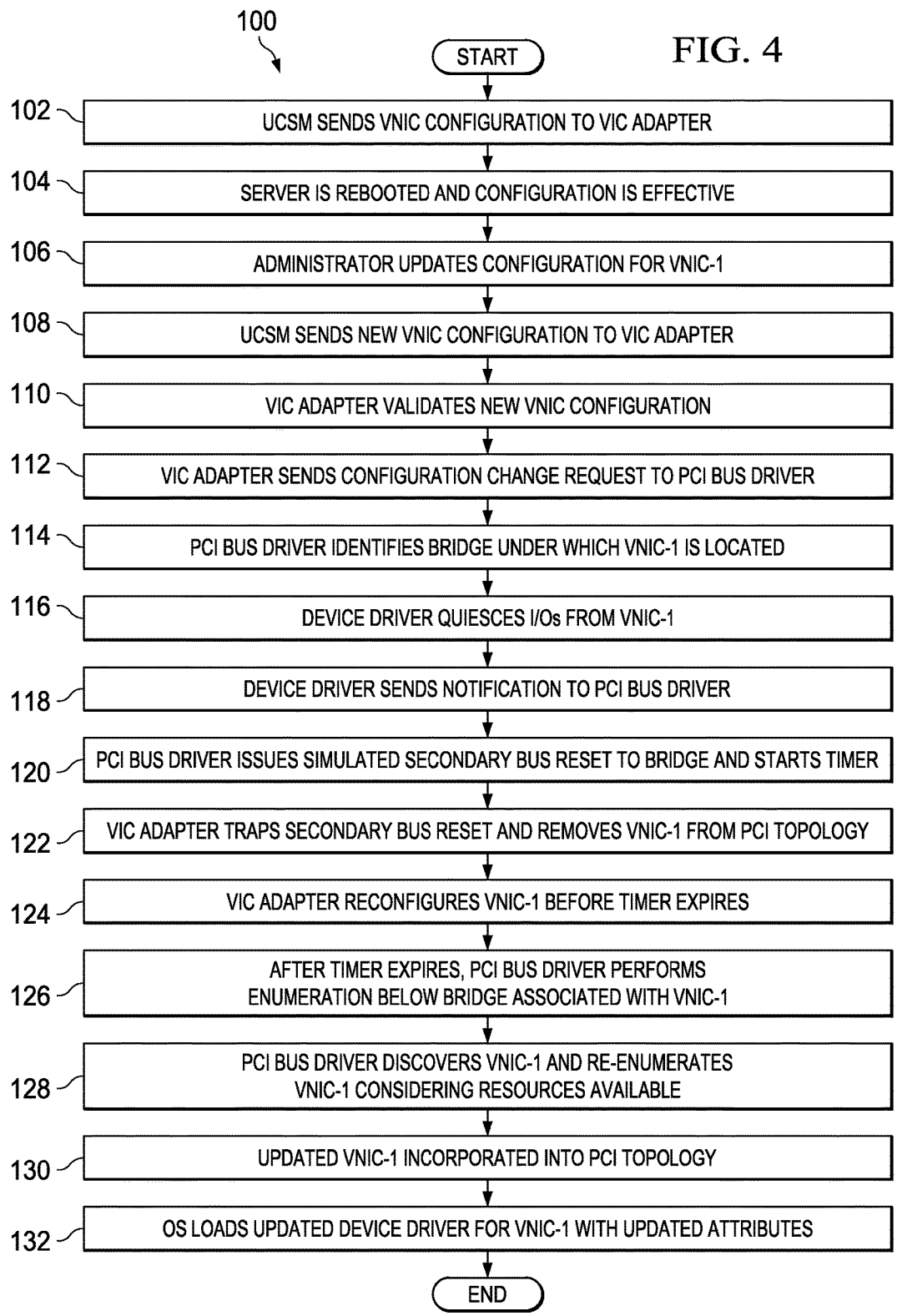
FIG. 4 is a simplified flow diagram illustrating example operations that may be associated with an embodiment of the communication system.

Turning to FIG. 4, FIG. 4 is a simplified flow diagram illustrating example operations 100 that may be associated with embodiments of communication system 10. At 102, UCSM 18 sends VNIC configuration 24 to VIC adapter 14. For example, the administrator provisions virtual devices 17 at server 12 according to a predefined configuration through UCSM virtual device policies. VIC adapter 14 validates VNIC configuration 24 and prepares its firmware and hardware to populate VNIC configuration 24 on server 12. VIC adapter 14 assigns resources (e.g., appropriate network interfaces, local storage areas of particular sizes in memory element 40) to virtual devices 17 taking into account future changes to attributes and features that can be mapped to corresponding virtual device 17. For example, VIC adapter 14 may allocate resources for virtual device 17 that enables it to function as an Ethernet controller according to VNIC configuration 24 taking into consideration that virtual device 17 may be reconfigured to a Fibre Channel controller in the future. At 104, server 12 is rebooted, the new PCI topology is projected to server 12's BIOS, which on enumeration and discovery identifies the attributes and features mapped to different virtual devices 17.

Merely for example purposes and not as a limitation, assume that the administrator changes the configuration for a particular virtual device 17, say VNIC-1 at 106. The administrator may change the configuration using a suitable graphical user interface (or command line interface, or other suitable interface) associated with UCSM 18. At 108, UCSM 18 sends new VNIC configuration 24 to VIC adapter 14 through appropriate communication channels, for example, through an internal control protocol. At 110, VIC adapter 14 validates various information in VNIC configuration 24, for example, identifying virtual device 17 (e.g., VNIC-1) for which new VNIC configuration 24 is requested; and determining whether the new resources can be accommodated by the resources allocated for VNIC-1 during previous enumeration. In some embodiments, validation may be requested for a specific feature set for VNIC-1 in VNIC configuration 24.

At 112, if the validation succeeds, VIC adapter 14 accepts VNIC configuration 24 and informs UCSM 18 about the successful validation. VIC adapter 14 also notifies PCI bus driver 32 in OS 38 of server 12 about the change of configuration for VNIC-1. In some embodiments, the notification may specify the specific PCIe bus, device and device functionality. At 114, PCI bus driver 32 determines the bridge below which affected virtual device 17, VNIC-1, resides. PCI bus driver 32 notifies device driver 34 of VNIC-1 about the change of configuration. At 116, device driver 34 quiesces I/Os from VNIC-1 and de-registers it from OS stack/application 36. At 118, device driver 34 informs PCI bus driver 32 that VNIC-1 is ready to be reconfigured. PCI bus driver 32 unloads (e.g., delinks) device driver 34 from OS PCI framework 30 and returns affected virtual device 17, VNIC-1, to an initial un-configured state.

At 120, PCI bus driver 32 issues the simulated secondary bus reset by setting bit 6 in the Bridge Control register in Type 1 header of the configuration space of the affected bridge below which VNIC-1 resides. PCI bus driver 32 starts a timer (e.g., according to PCI specification) to facilitate affected virtual device to be reconfigured. At 122, VIC adapter 14 traps the simulated secondary bus reset to the upstream port of the bridge. VIC adapter 14 determines that VNIC-1 is ready to be reconfigured and removes VNIC-1 from the PCI topology of OS 38. At 124, VIC adapter 14 reconfigures (e.g., implements VNIC configuration 24) VNIC-1 before the timer expires.

At 126, in some embodiments, after reconfiguration, VIC adapter 14 notifies PCI bus driver 32 of the completion; thereupon, PCI bus driver 32 performs enumeration below the affected bridge associated with VNIC-1. In other embodiments, after the timer expires, PCI bus driver 32 automatically performs enumeration, rescanning the PCI bus below the affected bridge and reassigning resources according to the initial enumeration. In some embodiments, at 128, PCI bus driver 32 discovers VNIC-1 and re-enumerates VNIC-1 in light of the allocated resources from the previous enumeration. At 130, the updated VNIC-1 is incorporated into the PCI topology. Post successful enumeration, PCI bus driver 32 links affected device driver 34 with VNIC-1. Device driver 34 then starts afresh to initialize VNIC-1, scans the properties of VNIC-1 and presents them to OS 38. At 132, OS 38 loads device driver 34 for VNIC-1 with the updated attributes.

Figure 5:
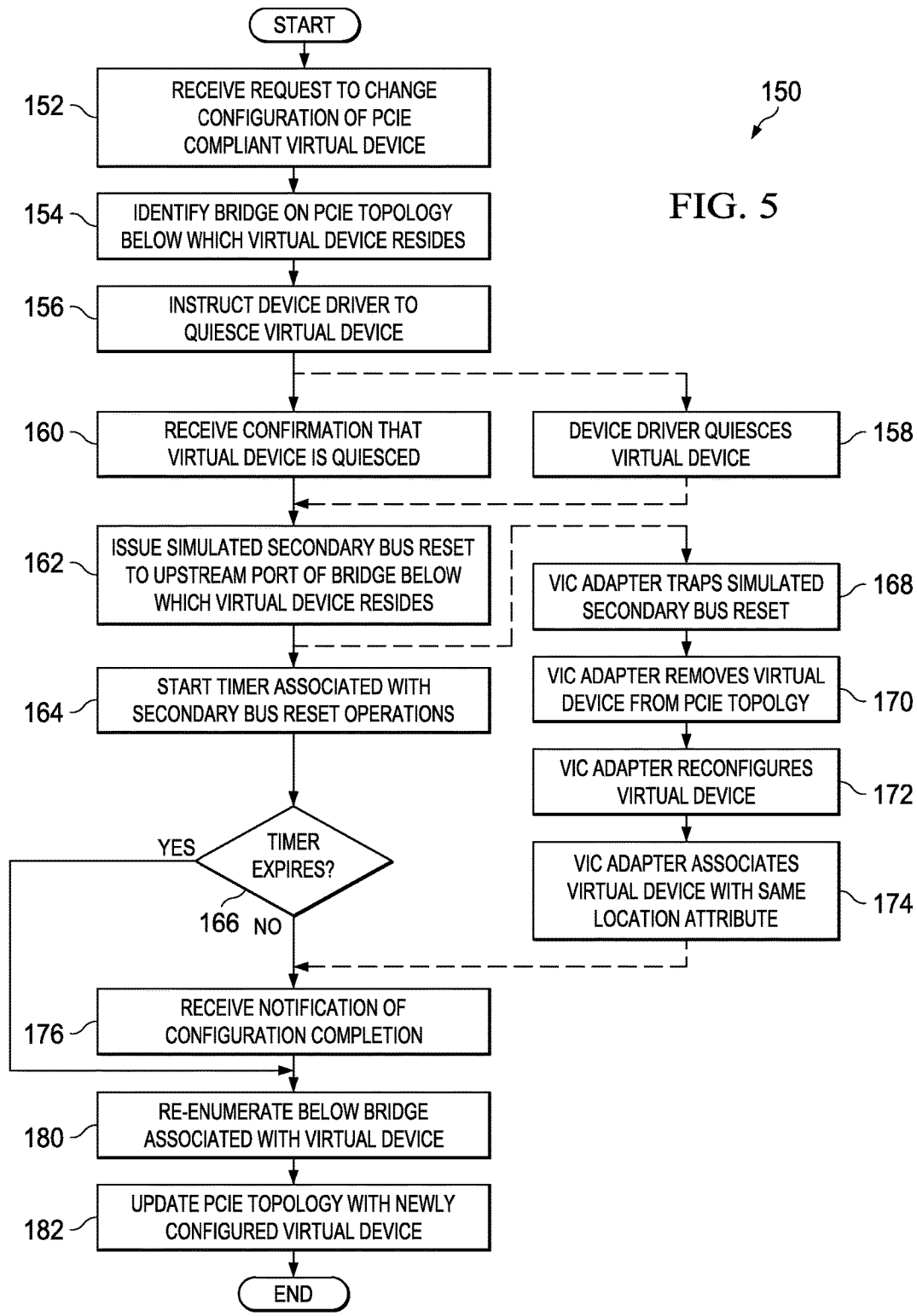
FIG. 5 is a simplified flow diagram illustrating other example operations that may be associated with an embodiment of the communication system.

Turning to FIG. 5, FIG. 5 is a simplified flow diagram 150 that may be associated with embodiments of communication system 10. At 152, PCI bus driver 32 receives a request to change configuration of PCIe compliant virtual device 17(2). Assume, merely as an example, and not as a limitation, that virtual device 17(2) is in a first configuration of an Ethernet controller, and the change in configuration will change it to a second configuration of a Fibre Channel controller. At 154, PCI bus driver 32 identifies bridge 66 below which virtual device 17(2) resides. At 156, PCI bus driver 32 instructs corresponding device driver 34 to quiesce virtual device 17(2). At 158, device driver 34 quiesces virtual device 17(2). At 160, PCI bus driver 32 receives confirmation (from device driver 34) that virtual device 17(2) is quiesced. At 162, PCI bus driver 32 issues a simulated secondary bus reset to upstream port 64 of bridge 66 below which virtual device 17(2) resides. At 164, PCI bus driver 32 starts a timer associated with standard (e.g., normal, regular) secondary bus reset operations, for example, according to PCIe specifications. At 166, a determination may be made whether the timer has expired.

In various embodiments, at 168, VIC adapter 14 may trap the simulated secondary bus reset. At 170, VIC adapter 14 may remove virtual device 17(2) from its location (e.g., having location attribute 04:00.0 BDF) from PCIe topology 60. At 172, VIC adapter 14 may reconfigure virtual device 17(2) to Fibre Channel controller. At 174, VIC adapter associates newly configured virtual device 17(2) with the same (e.g., previous) location attribute (e.g., 04:00.0 BDF) and sends a notification to PCI bus driver 32 of the configuration completion. At 176, PCI bus driver 32 receives notification of the configuration completion. At 180, PCI bus driver 32 may re-enumerate virtual devices below bridge 66 associated with virtual device 17(2). Note that if the timer expires at 166, PCI bus driver 32 may initiate re-enumeration without receiving notification of configuration completion from VIC adapter 14. At 182, PCI bus driver 32 may update PCIe topology 60 with newly configured virtual device 17(2).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, VIC adapter 14, PCI bus driver 32 and device driver 34. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, VIC adapter 14, PCI bus driver 32 and device driver 34 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 40, 44) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 42) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method executed at a server having a processor, comprising:
   receiving, during runtime of the server, a request associated with a Peripheral Component Interconnect Express (PCIe) compliant virtual device in a first configuration, the request comprising a change in configuration of the virtual device to a second configuration that is different than the first configuration;
   identifying a bridge on a PCIe topology below which the virtual device is located;
   issuing a simulated bus reset to the bridge, wherein the virtual device is reconfigured according to the change in configuration after the simulated bus reset is issued;
   setting a recovery time period by starting a timer after issuing the simulated bus reset, the timer started according to PCIs specifications to provide the recovery time period for the virtual device;
   re-enumerating below the bridge after the change in configuration completes without rebooting the server; and
   updating the PCI topology with the virtual device in the second configuration.

2. The method of claim 1, further comprising:
   trapping, via a virtual interface card (VIC) adaptor, the simulated bus reset;
   removing, via the VIC adaptor, the virtual device from a location having a location attribute in the PCI topology;
   reconfiguring, via the VIC adaptor, the virtual device from the first configuration to the second configuration; and
   associating, via the VIC adaptor, the virtual device in the second configuration with the location attribute.

3. The method of claim 2, further comprising:
   validating, via the VIC adaptor, the second configuration; and
   sending, via the VIC adaptor, the request to the server.

4. The method of claim 3, wherein the validating comprises ensuring that resources allocated to the virtual device in the first configuration is sufficient in the second configuration.

5. The method of claim 2, wherein the second configuration is pushed to the VIC adapter by a unified computing system manager (UCSM).

6. The method of claim 1, further comprising:
   instructing a device driver associated with the virtual device about the configuration change,
   wherein the device driver quiesces input/output (I/O) to and from the virtual device before the simulated bus reset.

7. The method of claim 6, further comprising:
   receiving a notification from the device driver that the virtual device is quiesced,
   wherein the simulated bus reset is issued after receiving the notification from the device driver.

8. The method of claim 1, wherein the virtual device comprises a virtual network interface card (VNIC).

9. The method of claim 1, wherein the second configuration changes a functionality of the virtual device from an Ethernet controller to a Fibre channel controller.

10. The method of claim 1, further comprising:
    re-enumerating after the timer expires.

11. The method of claim 1, wherein issuing the simulated bus reset comprises setting a bus reset bit in a bridge control register in Type 1 header of a configuration space of the bridge.

12. Non-transitory tangible media that includes instructions for execution, which when executed by a processor of a server, is operable to perform operations comprising:
    receiving, during runtime of the server, a request associated with a PCIe compliant virtual device in a first configuration, the request comprising a change in configuration of the virtual device to a second configuration that is different than the first configuration;
    identifying a bridge on a PCIe topology below which the virtual device is located;
    issuing a simulated bus reset to the bridge, wherein the virtual device is reconfigured according to the change in configuration after the simulated bus reset is issued;
    setting a recovery time period by starting a timer after issuing the simulated bus reset, the timer started according to PCIs specifications to provide the recovery time period for the virtual device;
    re-enumerating below the bridge after the change in configuration completes without rebooting the server; and
    updating the PCI topology with the virtual device in the second configuration.

13. The media of claim 12, further comprising:
    trapping, via a virtual interface card (VIC) adaptor, the simulated bus reset;
    removing, via the VIC adaptor, the virtual device from a location having a location attribute in the PCI topology;
    reconfiguring, via the VIC adaptor, the virtual device from the first configuration to the second configuration; and
    associating, via the VIC adaptor, the virtual device in the second configuration with the location attribute.

14. The media of claim 12, wherein the operations further comprise:
    starting a timer for a preconfigured recovery time period after issuing the simulated bus reset, and re-enumerating after the timer expires.

15. The media of claim 12, wherein issuing the simulated bus reset comprises setting a bus reset bit in a bridge control register in Type 1 header of a configuration space of the bridge.

16. An apparatus, comprising:
    a physical memory for storing data; and
    a processor, wherein the processor executes instructions associated with the data, wherein the processor and the physical memory cooperate, such that the apparatus is configured for:
      receiving, during runtime of the server, a request associated with a PCIe compliant virtual device in a first configuration, the request comprising a change in configuration of the virtual device to a second configuration that is different than the first configuration;

identifying a bridge on a PCIe topology below which the virtual device is located;

issuing a simulated bus reset to the bridge, wherein the virtual device is reconfigured according to the change in configuration after the simulated bus reset is issued;

setting a recovery time period by starting a timer after issuing the simulated bus reset, the timer started according to PCIs specifications to provide the recovery time period for the virtual device;

re-enumerating below the bridge after the change in configuration completes without rebooting the server; and updating the PCI topology with the virtual device in the second configuration.

17. The apparatus of claim 16, further comprising:

a virtual interface card (VIC) adaptor configured to:

trap the simulated bus reset;

remove the virtual device from a location having a location attribute in the PCI topology;

reconfigure the virtual device from the first configuration to the second configuration; and associate the virtual device in the second configuration with the location attribute.

18. The apparatus of claim 16, further configured for instructing a device driver associated with the virtual device about the configuration change, wherein the device driver quiesces I/O to and from the virtual device before the simulated bus reset.

19. The apparatus of claim 16, further configured for starting a timer for a preconfigured recovery time period after issuing the simulated bus reset, and re-enumerating after the timer expires.

20. The apparatus of claim 16, wherein issuing the simulated bus reset comprises setting a bus reset bit in a bridge control register in Type 1 header of a configuration space of the bridge.

* * * * *